(No Model.)

C. H. SMITH.
TIRE SETTER.

No. 281,574. Patented July 17, 1883.

WITNESSES:
Chas. T. Howell.
C. Sedgwick

INVENTOR:
C. H. Smith
BY Munn & Co.
ATTORNEYS.

UNITED STATES PATENT OFFICE.

CHARLES H. SMITH, OF EAU CLAIRE, WISCONSIN.

TIRE-SETTER.

SPECIFICATION forming part of Letters Patent No. 281,574, dated July 17, 1883.

Application filed October 7, 1882. (No model.)

*To all whom it may concern:*

Be it known that I, CHARLES H. SMITH, of Eau Claire, in the county of Eau Claire and State of Wisconsin, have invented certain new and useful Improvements in Setting Up the Rims or Fellies of Wheels for Vehicles, of which the following is a full, clear, and exact description.

This invention relates to wheels of vehicles constructed with sectional fellies, and has for its object not merely cheapness in the construction of the wheel, but the obtaining of an absolute tension on the felly independently of the action of the spokes.

The invention consists in a method of putting the sectional felly, under pressure, into the tire of the wheel before the spokes are inserted; and it also consists in certain means for thus putting in the felly, substantially as hereinafter described.

Reference is to be had to the accompanying drawings, forming part of this specification, in which similar letters of reference indicate corresponding parts in both the figures.

Figure 1:
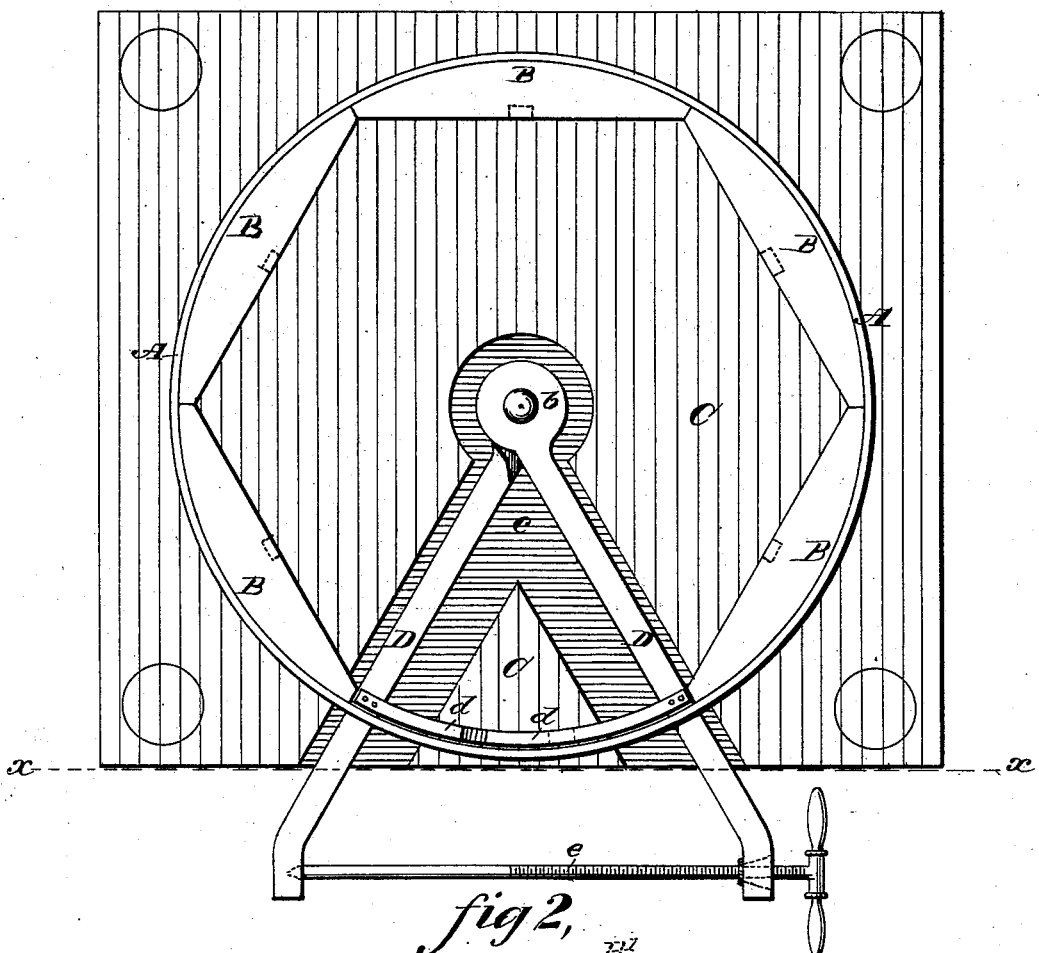
Figure 2:
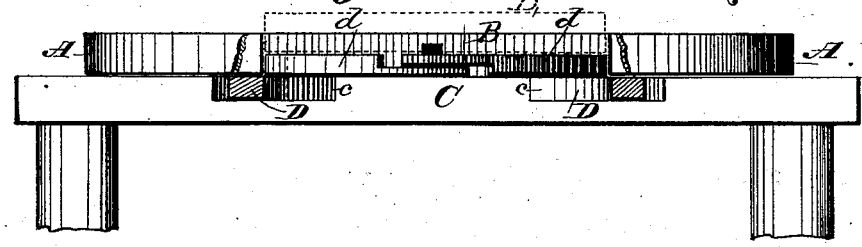

Figure 1 represents a plan view of a table and means for setting up the rim of a wheel in accordance with my invention, and showing sections of the felly as being forced outward to their places within the tire; and Fig. 2 is a sectional elevation of the same on the line $x\ x$ in Fig. 1, showing also, in dotted lines, a finishing felly-section as entered to its place between the other felly-sections, a portion of the tire being broken away.

A in the drawings indicates the tire of the wheel, and B B' its felly-sections, having their ends made to fit square, or otherwise bear one against the other, and either of a straight, concave, or other configuration on their inside faces. The tires of a series of similar wheels to be manufactured are first made of a uniform size, as near as practicable, and the felly-sections formed of given dimensions, varying in number with the size of the wheel, or as other circumstances may direct. The closed tire A, to be fitted with the felly-sections, is then sufficiently heated to give it the requisite expansion and laid upon a table, C, after which the felly-sections B are laid in their places, leaving a gap or space for the remaining felly-section, B'. Pressure is then brought to bear upon the exposed ends of the felly-sections B next to said gap by a spreading or expanding device to force all of said sections B firmly against one another and outward against the tire A. This spreading device may consist, mainly, of two jaws, D D, pivoted to the table C, as at $b$, in the center of the tire, and arranged to work within a recess, $c$, in the table, so as to lie below the level of the table, and so that the tire A lies above them, excepting at their parts which bear against the felly-sections B B, on either side of the gap left in the rim, which bearing portions of the jaws are raised to press against the exposed ends of said felly-sections. These raised portions $d\ d$ of the jaws only project partly up within the tire—that is, for a portion of its depth—in order to leave room for subsequently entering the finishing felly-section B' within the gap left by the sections B. Either one or both of the projections $d$ on the jaws may be formed or extended, and be suitably shaped on their outer side, to conform to the curve of the tire and to fit closely against it, so as to keep the tire from flattening between the points of pressure by the jaws on the felly-sections B B, against which they act. The jaws D D may be forced apart to give the necessary pressure on the felly-sections B B by means of a screw, $e$, a wedge, eccentric, or any other suitable mechanical device. After the felly-sections B have been thus pressed home and outward the final or finishing felly-section B' (shown by dotted lines in Fig. 2) is entered within the gap left in the rim before the rim or partial rim is removed from the jaws. Said finishing felly-section is then, or rather subsequently, driven, by hammer or otherwise, fully home down within the tire and the tire allowed to cool. In this way the rim is put into the tire regardless of the hub and spokes of the wheel, and all the tension that is desirable is put upon the felly independently of the spokes, which, as well as the hub of the wheel, may be of any suitable construction. To facilitate this method of setting up the rim, I propose to have a number of the final or finishing felly-sections B' of different lengths, including sections of an average length, in order that the gap between the felly-sections B may be filled with a machine-made felly-section without having resort to cutting or trimming it, and so that a perfect fit and perfect joints may be secured, even though some of the tires are a little larger or a little smaller than they should be. The tires also may be cut to a specified length and welded to a given size, as near as practicable, and any variation in size be provided for by the final felly-section without loss of time or tension.

Among the advantages which may be specified for setting up the rim in accordance with my invention may be named, first, that it allows the tire to be cut by machinery to an exact length, and welded, as near as practicable, to a given size, which on small work is a great advantage over the ordinary method of making each tire to fit its own wheel, involving special measurements of both wheel and tire; secondly, it allows machine-made felly-sections to be used without cutting or trimming, thereby securing perfect joints without extra labor; thirdly, it secures an absolute tension on the rim, independently of any pressure from the spokes, thus making not only a superior but a durable and cheap rim.

Having thus fully described my invention, I claim as new and desire to secure by Letters Patent—

1. The method herein described of setting up the rims or fellies of wheels composed of a series of felly-sections and fitting the same to their tires, consisting of first inserting within the closed tire, while hot, a number of felly-sections and arranging them so as when bearing one against the other they will leave a vacant felly-section space, subsequently applying pressure to the exposed ends of the separated felly-sections to force them apart, then entering a final felly-section in said vacant space, and subsequently driving the same home and allowing the tire to cool, substantially as specified.

2. In an apparatus for fitting felly-sections to their places within the tire before inserting the spokes, the combination, with a recessed supporting-table, of expanding jaws pivoted in the recess thereof, and provided with the raised bearing portions, substantially as herein shown and described.

3. In a spreading device for fitting felly-sections to their places within the tire of a wheel and applying tension thereto, the combination, with the pivoted jaws D D, having raised portions or projections d d on their upper side or face, of a screw, e, or its mechanical equivalent, for actuating the jaws, substantially as shown and described.

4. The combination, with the adjustable jaws D D, and means, substantially as described, for operating them, of the projections d d thereon, of convex curvature on their exterior, and arranged to extend toward each other, substantially as and for the purposes herein set forth.

CHARLES HAZOR SMITH.

Witnesses:
  H. B. WALMSLEY,
  ANDREW CHAMBERS.